UNITED STATES PATENT OFFICE.

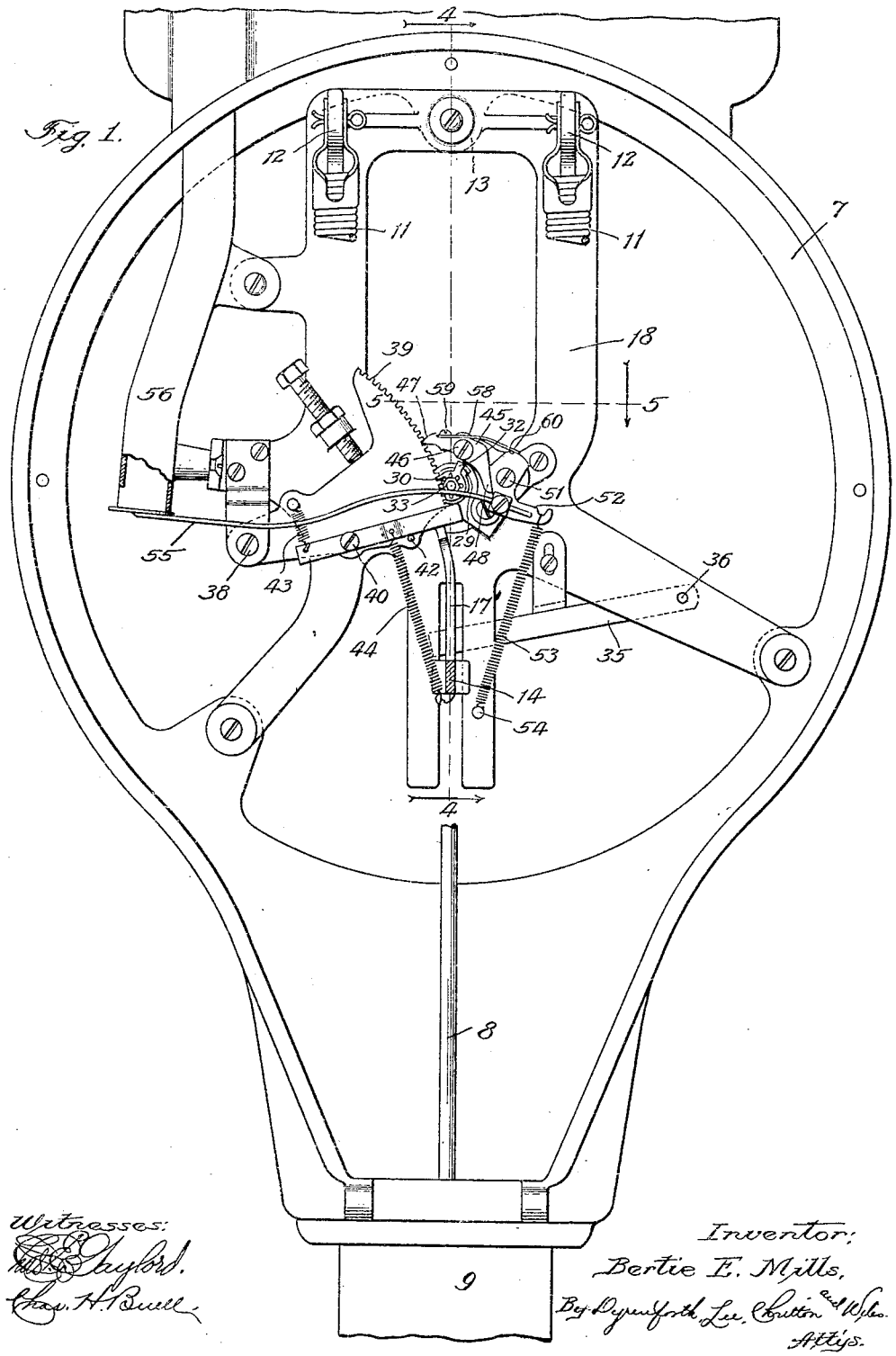

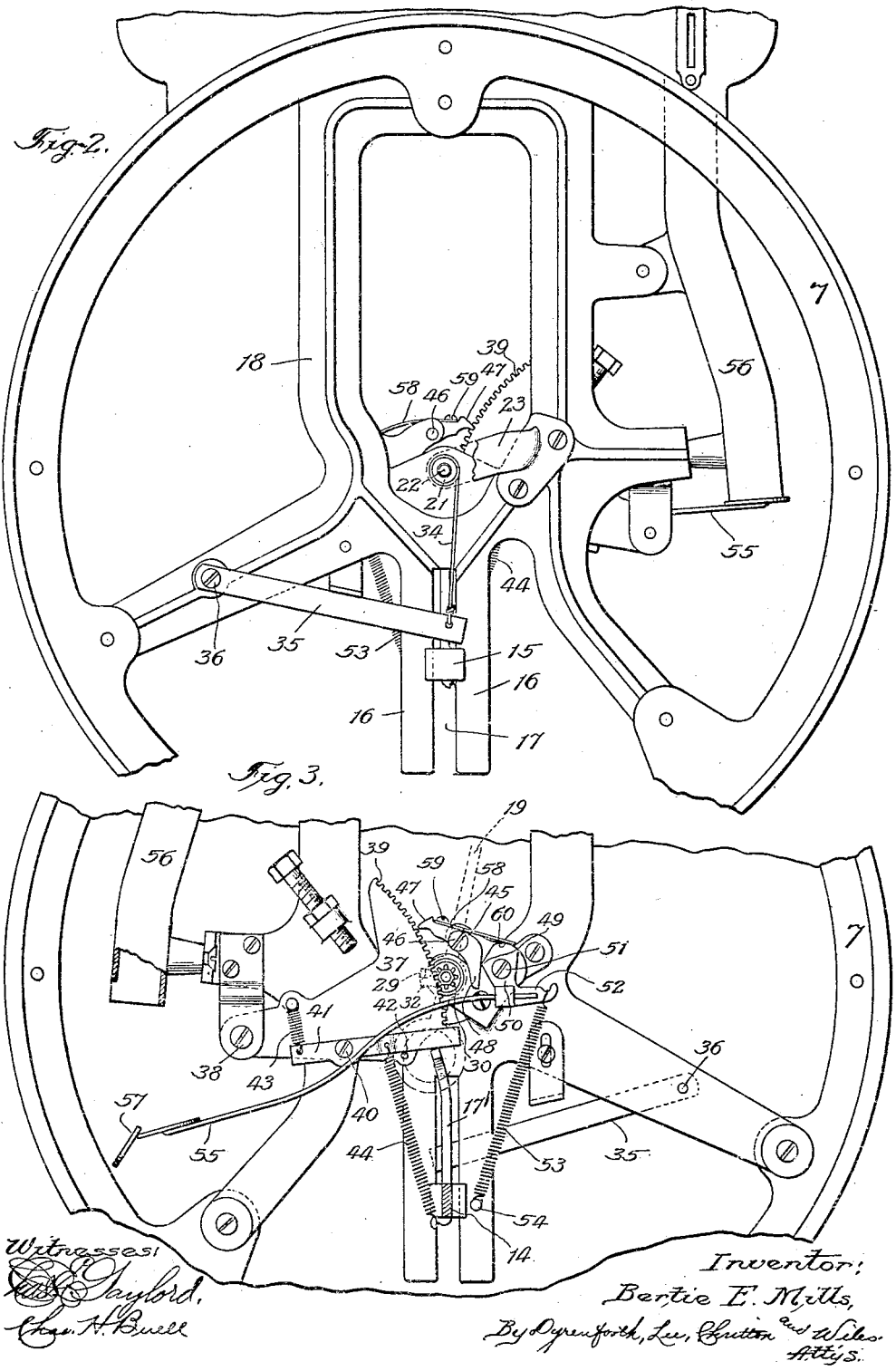

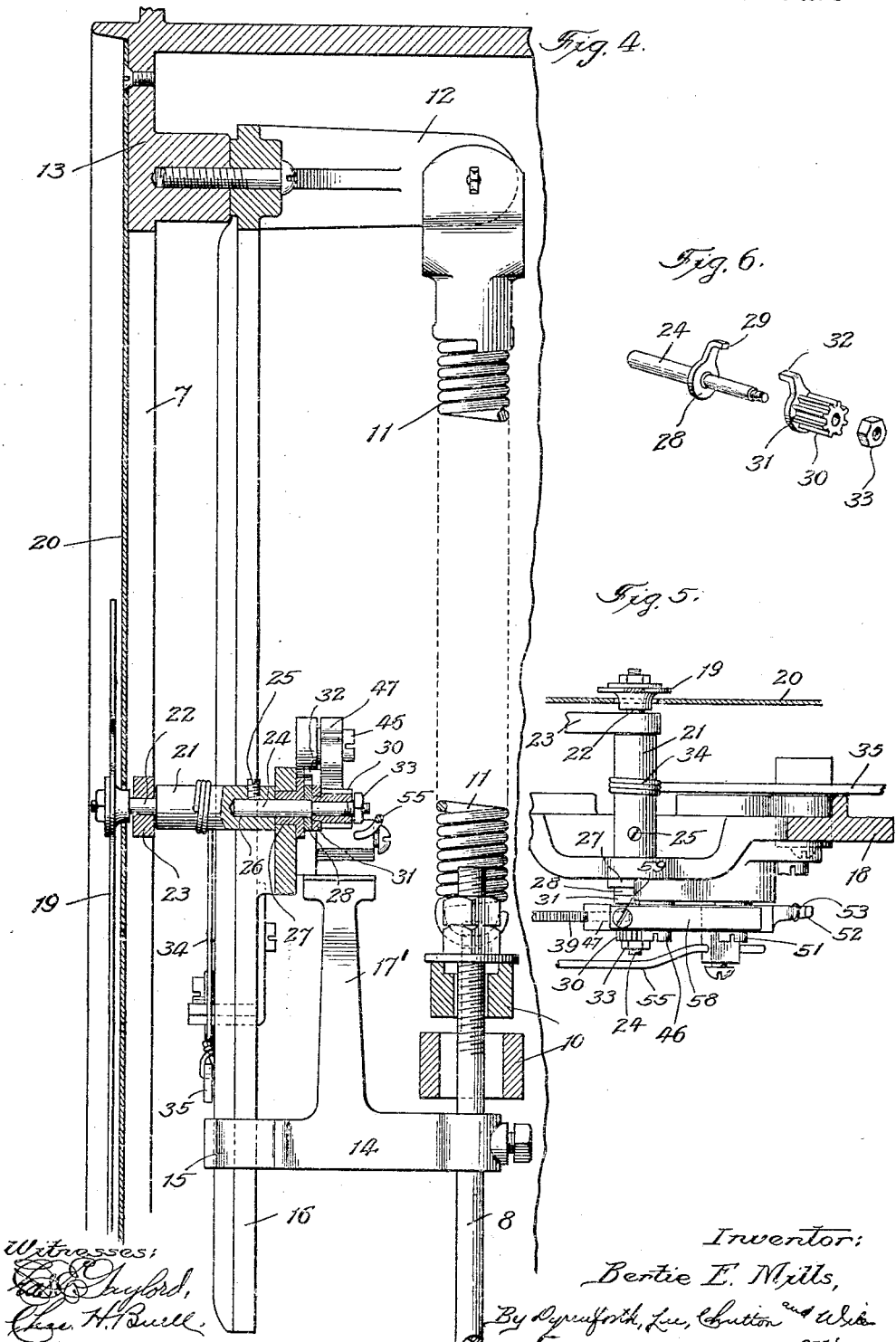

BERTIE E. MILLS, OF CHICAGO, ILLINOIS, ASSIGNOR TO MILLS NOVELTY COMPANY, OF CHICAGO, ILLINOIS, A CORPORATION OF ILLINOIS.

WEIGHING-SCALE.

1,272,835.   Specification of Letters Patent.   Patented July 16, 1918.

Application filed April 24, 1917. Serial No. 164,094.

*To all whom it may concern:*

Be it known that I, BERTIE E. MILLS, a citizen of the United States, residing at Chicago, in the county of Cook and State of Illinois, have invented a new and useful Improvement in Weighing-Scales, of which the following is a specification.

My invention relates, more particularly, to improvements in weighing scales of the so-called spring type, and more especially to spring scales involving a dial having the weighing scale provided thereon in circular form for coöperation with a pointer actuated through the medium of mechanism operated by the application of the weight of a person to the scale, the operation of this mechanism being controlled by a locking mechanism which normally prevents weighing, but which is moved out of position preventing weighing, upon the insertion of a proper coin or other token, into the machine; my invention consisting of improvements in the locking mechanism provided for the purpose above referred to, and the mechanism directly controlling the movement of the pointer.

It may be stated as a preface to the recital of the objects of my invention, that as scales have been hitherto constructed, it is sometimes possible to release the weighing mechanism to such an extent as to effect a more or less accurate weighing of a person on the scale, without the introduction of a coin into the machine, by a person jarring the weighing platform, as by jumping up and down on it, which it will be manifest, is an objectionable condition.

My objects, generally stated, are to so improve the locking mechanism of a scale that it will be of simple and inexpensive construction and will avoid the above stated objection and prevent the scale from weighing unless, and until, the proper coin is deposited in the machine; and to provide novel and simple mechanism for actuating, and controlling the actuation of, the pointer.

Referring to the accompanying drawings;

Figure 1 is a rear view of a spring scale of the dial type, and of a construction commonly employed, and embodying my improvements, certain portions of the mechanism through the medium of which the pointer mechanism is operated from the weighing platform being broken away.

Fig. 2 is a front view of the portion of the scale shown in Fig. 1, with the dial plate and pointer removed, these two figures showing the mechanism in normal position.

Fig. 3 is a broken view like Fig. 1 showing the mechanism in the position it assumes during its actuation by a coin while a weight rests on the platform of the scale.

Fig. 4 is an enlarged broken section taken at the line 4 on Fig. 1 and viewed in the direction of the arrow.

Fig. 5 is an enlarged section taken at the line 5 on Fig. 1 and viewed in the direction of the arrow; and Fig. 6, a perspective view of a detail of the pinion-equipped pointer-shaft.

Inasmuch as the invention to which this application relates has to do with only that portion of the mechanism of a spring scale which is located in the dial-equipped casing thereof usually provided on the upper end of a hollow standard, I have eliminated from the showing in the drawings, everything below the said casing, which latter is represented at 7 and is of common construction. The rod, through the medium of which the pointer-actuating mechanism is operated, by the application of a weight to the weighing platform, (not shown) is represented at 8, this rod extending downwardly through the standard 9 where it connectes with mechanism, in accordance with common practice, whereby it is caused to lower to an extent commensurate with the weight placed upon the weighing platform. The upper end of the rod 8 is connected with a cross-head 10 which connects at its opposite ends with springs 11 secured at their upper ends to lugs 12 extending rearwardly from an annular flange 13 provided about the interior of the casing 7 adjacent its front edge, these springs serving the usual purpose of yieldingly supporting the rod 8 and against the resistance of which this rod moves downwardly under the weight applied to the weighing platform of the scale. The rod 8 has rigidly secured thereto a member 14, the forward end 15 of which extends into and is vertically movable in a guide groove 17 provided in a frame 18 secured in the casing 7 adjacent its forward edge and extending substantially parallel with the flange 13, the member 14 having an upwardly projecting section 17′ for a purpose hereinafter explained.

The shaft on which the pointer represented at 19 and which coöperates with the scale (not shown) provided on the scale dial 20 secured to the casing 7 at the flange 13 thereof, is secured, is formed of a section 21 journaled at its forward reduced end 22 to which the pointer 19 is connected in a bearing provided in an arm 23 carried by the frame 18, a section 24 of smaller diameter secured as by a set-screw 25 in a socket 26 in the inner end of the shaft section 21, the section 24 being journaled in a bushing 27 mounted in a portion of the frame 18. The shaft section 24 carries a disk 28 provided with a shoulder 29, this disk being rigid on the shaft section 24, the latter also carrying a pinion 30 rotatably mounted on this shaft and having a disk 31 rigid therewith and provided with a shoulder 32 adapted to engage the shoulder 29. A nut 33 screws upon the threaded end of the section 24 and holds the pinion 30 against displacement. By the arrangement just described, the pointer and shaft on which it is carried is free to rotate in a clockwise direction in Fig. 2 except as restrained by the engagement of the shoulder 29 with the shoulder 32, the means provided for actuating the pointer comprising a cable 34 wound upon the shaft-section 21 and secured thereto at one end as represented, and connected at its lower end with a lever 35 fulcrumed on the frame 18 at 36. The lever 35 is of such weight that it will operate through the cable 34 to rotate the shaft 21 and with it the pointer 19 except as restrained by the shoulder 32.

The pinion 30 is actuated through the medium of a segmental rack 37 pivoted as indicated at 38 to a part of the frame 18, and meshing at its teeth 39 with the said pinion. The rack 37 has pivoted thereto at 40 a lever 41 which bears against a stop 42 on this rack, under the action of a coiled spring 43 connected with the rack and one end of the lever 41. The arm 17' extends under the right hand end of the lever 41 in Fig. 3 and operates in a well known manner to return the rack 37 to normal position upon removing the weight from the platform. The lowering of the rod 8 upon placing a weight upon the platform, as hereinbefore described, serves to lower the arm 17' permitting the rack 37 to swing downwardly on its pivot 38 when released for operation as hereinafter explained, it being preferred that a coiled spring 44 be connected with the member 14 and lever 41 to insure the swinging of the rack 37 as stated. The lowering of the rack rotates the pinion 30 in a clockwise direction in Fig. 2 thus permitting the lever 35 through the cable 34 to rotate the pointer relative to the dial to indicate the weight upon the platform.

In the apparatus disclosed the movement of the rack 37 as stated, is controlled through the medium of coin actuated mechanism embodying one of the features of my invention. This mechanism comprises a dog 45 fulcrumed as indicated at 46 on a part of the frame 18 to extend at its nose 47 adjacent the teeth 39 of the rack and so formed and positioned as shown as to prevent the rack from swinging downwardly from the normal position indicated in Fig. 1 until this dog is released, but permitting the rack to swing upwardly without obstruction. The dog 45 has a tail-piece 48 extending at an angle to the nose portion 47 thereof with which the portion 49 of a lever 50 coöperates. The lever 50 is fulcrumed at 51 on the frame 18 and is so arranged relative to the dog 45, that in its movement in counter-clockwise direction in Fig. 1 to the position shown in Fig. 3, the nose 47 of the dog will be rocked out of engagement with the teeth 39, the lever 50 having an angularly disposed section 52 which connects with one end of a coil spring 53, the lower end of this spring being connected at 54 with the frame 18, whereby the lever 50 tends to assume the normal position illustrated in Fig. 1 in which the rack 37 is locked. The lever 50 is provided with a member 55 which normally occupies the position shown in Fig. 1 wherein it closes the lower end of a coin-slot 56. When the proper coin, as for instance that represented at 57, is introduced into the slot 56 the weight thereof will rock the lever 50 on its fulcrum 51 to the position shown in Fig. 3 thus releasing the rack 37 and permitting it to lower when a weight is on the platform, as hereinbefore described, the coin 57 automatically disengaging from the member 55 and the spring 53 thereupon returning the parts to the position shown in Fig. 1.

The dog 45 carries a flat spring 58 secured thereto as indicated at 59, this spring extending over the pivot 46 and bearing against the curved upper surface 60 of the lever 50, preferably at a point substantially in line vertically with the axis of the pivot 51, this spring tending to rotate the dog 45 in a counter-clockwise direction in Fig. 3. The operation of the scale, considered generally, is as follows; assuming a person to have stepped upon the weighing platform of the scale, the rod 8 and with it the member 14 lowers to a degree depending upon the weight applied to the weighing platform. In this position the rack 37 is locked by the dog 45 and the pointer remains at zero. Upon dropping a coin into the slot 56, the engagement of the coin with the member 55 rocks the lever 50 and consequently the dog 45 from the positions shown in Fig. 1 to the positions shown in Fig. 3, thus releasing the rack 37 and permitting it to rock downwardly until arrested by engaging the upper end of the arm 17', this movement of the rack rotating the pinion 30 and consequently the shoulder 32 which permits the lever 35 through the medium of the cord 34 to rotate the pointer to a position on the scale for indicating the weight on the weighing platform. The member 55, upon the disengagement of the coin 57 therefrom returns to normal position (Fig. 1) with the result that the dog 45 moves to a position in which it again prevents lowering of the rack 37. When the person steps off the platform, the rod 8 and the parts connected therewith are lifted by the springs 11 to normal position and in this movement the arm 17' by engaging the lever 41 forces the rack 37 upwardly to normal position (Fig. 1), the dog 45 in this movement of the rack operating idly. The movement of the rack 37 to normal position as stated rotates the pinion 30 in counter-clockwise direction in Fig. 2 and by reason of the engagement of the shoulder 32 with the shoulder 29 the cable 34 is wound upon the pointer shaft, the lever 35 is raised and the pointer returns to zero position. One of the many advantages of constructing a scale in accordance with my invention is that the danger of releasing the dog 45 from engagement with the rack 39 upon jarring the weighing platform, as by a person jumping up and down on it, is avoided, and thus it is not possible to release the dog except through the depositing of a proper coin into the machine. Furthermore the locking mechanism provided is very sensitive in operation and is quick and positive in action.

Another feature of the mechanism just referred to is the relatively great leverage exerted against the locking dog by the application of a coin introduced into the machine through the coin-slot, to the lever 50. It will be understood that while the locking mechanism must be so constructed as to positively prevent the lowering of the rack 37, until the dog is released, it must be releasable positively by the weight of the coin, these conditions being met in a highly satisfactory degree by constructing the locking mechanism in accordance with my invention.

While I have illustrated and described a particular construction in which my invention is embodied, I do not wish to be understood as intending to limit it thereto, as the same may be variously modified and altered without departing from the spirit of my invention, it being my intention to claim my invention as fully and completely as the prior state of the art will permit.

What I claim as new and desire to secure by Letters Patent is:—

1. In a weighing scale, the combination of a dial, a shiftable member operable by the application of weight to the scale and forming a stop, a second, shiftable, member coöperating with said stop and tending to shift toward said stop, releasable means for controlling the movement of said second member, a pointer for coöperation with said dial, means tending to move said pointer relative to said dial, and means for controlling the rotation of said pointer under the action of said second-named means, from said second member.

2. In a weighing scale, the combination of a dial, a shiftable member operable by the application of weight to the scale and forming a stop, rack and pinion mechanism coöperating with said stop and tending to move toward said stop, releasable means for controlling the movement of said mechanism, a pointer for coöperation with said dial, means tending to move said pointer relative to said dial, and means operatively engaging said pinion and operating to control the rotation of said pointer under the action of said second-named means, from said rack and pinion mechanism.

3. In a weighing scale, the combination of a dial, a shiftable member operable by the application of weight to the scale and forming a stop, a gravity-operated rack coöperating with said stop and tending to move toward the latter, a pinion meshing with said rack, releasable means for controlling the movement of said rack, a pointer for coöperation with said dial, means tending to move said pointer relative to said dial, and means operatively engaging said pinion and operating to control the rotation of said pointer under the action of said second-named means, from said rack.

4. In a weighing scale, the combination of a dial, a pointer for coöperation therewith and mounted to rotate, a shoulder on said pointer, means tending to move said pointer relative to said dial, a movable member having a shoulder opposing said first-named shoulder and controlling the movement of said pointer by said first-named means and tending to move in a direction for shifting said second-named shoulder in a direction away from said first-named shoulder, releasable means for controlling the movement of said movable member, and a second, shiftable, member forming a stop for said movable member and operating when weight is applied to the scale to move in a direction away from said movable member.

5. In a weighing scale, the combination of a dial, a pointer for coöperation therewith, a rotatable member to which said pointer is connected, means tending to rotate said rotatable member in one direction for moving said pointer relative to said dial, a shoulder on said rotatable member, a movable member having a shoulder opposing said first-named shoulder and controlling the movement of said pointer by said first-named means and tending to move in a direction for shifting said second-named shoulder in a direction away from said first-named shoulder, releasable means for controlling the movement of said movable member, and a third, shiftable, member forming a stop for said movable member and operating when weight is applied to the scale to move in a direction away from said movable member.

6. In a weighing scale, the combination of a dial, a pointer for coöperation therewith, a rotatable shaft to which said pointer is connected, said shaft being provided with a shoulder, means tending to rotate said shaft in one direction for moving said pointer relative to said dial, a shoulder rotatably mounted relative to said shaft and opposing said first-named shoulder and controlling the movement of said shaft by said first-named means and tending to move in a direction away from said first-named shoulder, releasable means for controlling the movement of said second-named shoulder, and a member presenting means which serve to limit the movement of said second-named shoulder and operating when weight is applied to the scale to move in a direction away from said second-named shoulder.

7. In a weighing scale, the combination of a dial, a pointer for coöperation therewith mounted to rotate, a shoulder on said pointer, means tending to move said pointer relative to said dial, a rack, a pinion meshing with said rack, a shoulder operatively engaging said pinion and opposing said first-named shoulder and controlling the movement of said pointer by said first-named means, said rack tending to move in a direction for shifting said second-named shoulder in a direction away from said first-named shoulder, releasable means for controlling the movement of said rack, and a shiftable member forming a stop for said rack when released and operating when weight is applied to the scale to move in a direction away from said rack.

8. In a weighing scale, the combination of a dial, a pointer for coöperation therewith mounted to rotate, a shoulder on said pointer, means tending to move said pointer relative to said dial, a pivotally supported gravity-operated segmental rack, a pinion meshing with said rack, a shoulder operatively engaging said pinion and opposing said first-named shoulder and controlling the movement of said pointer by said first-named means, said rack tending to move by gravity in a direction for shifting said second-named shoulder in a direction away from said first-named shoulder, releasable means for controlling the movement of said rack, and a shiftable member forming a stop for said rack when the latter is released and operating when weight is applied to the scale to move in a direction away from said rack.

9. In a weighing scale, the combination of a dial, a pointer for coöperation therewith, mounted to rotate, a cable extending about the axis of said pointer, a pivotally supported lever connected with the lower end of said cable and operating to rotate said pointer in one direction relative to said dial through the medium of said cable, and means restraining the movement of said pointer operable by the application of a weight to the scale to permit said first-named means to actuate said pointer.

BERTIE E. MILLS.

Copies of this patent may be obtained for five cents each, by addressing the "Commissioner of Patents, Washington, D. C."